US012254563B2

(12) United States Patent
Palmer

(10) Patent No.: US 12,254,563 B2
(45) Date of Patent: Mar. 18, 2025

(54) MAPPING INTERIOR ENVIRONMENTS BASED ON MULTIPLE IMAGES

(71) Applicant: LexisNexis Risk Solutions FL Inc., Boca Raton, FL (US)

(72) Inventor: Victor Palmer, Denver, CO (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 181 days.

(21) Appl. No.: 18/063,845

(22) Filed: Dec. 9, 2022

(65) Prior Publication Data

US 2023/0186557 A1    Jun. 15, 2023

Related U.S. Application Data

(60) Provisional application No. 63/288,341, filed on Dec. 10, 2021.

(51) Int. Cl.
*G06T 17/00* (2006.01)
*G06T 7/73* (2017.01)

(52) U.S. Cl.
CPC ............. *G06T 17/00* (2013.01); *G06T 7/73* (2017.01); *G06T 2207/20084* (2013.01)

(58) Field of Classification Search
CPC .. G06T 17/00; G06T 7/73; G06T 2207/20084
See application file for complete search history.

(56) References Cited

U.S. PATENT DOCUMENTS

| | | | | |
|---|---|---|---|---|
| 11,138,757 B2* | 10/2021 | Jovanovic | ............... | G06T 19/20 |
| 2015/0369593 A1* | 12/2015 | Myllykoski | ............... | G06T 5/80 |
| | | | | 348/136 |
| 2020/0357132 A1* | 11/2020 | Jovanovic | ................. | G06T 7/80 |
| 2021/0183080 A1* | 6/2021 | Hoiem | .................... | G06T 19/20 |

OTHER PUBLICATIONS

Liu, Chen, et al. "Planercnn: 3d plane detection and reconstruction from a single image." Proceedings of the IEEE/CVF Conference on Computer Vision and Pattern Recognition. 2019. (Year: 2019).*
"PlaneRCNN: 3D Plane Detection and Reconstruction From a Single Image" Liu et al.; Proceedings of the IEEE/CVF Conference on Computer Vision and Pattern Recognition (CVPR), 2019, pp. 4450-4459.
"Numerical Optimization," Nocedal and Wright, 2nd Edition, 2006 Springer, New York.

* cited by examiner

*Primary Examiner* — Yu Chen
(74) *Attorney, Agent, or Firm* — Troutman Pepper Hamilton Sanders LLP; James E. Schutz; Mark Lehi Jones

(57) ABSTRACT

Systems and methods for creating a two-dimensional orthographic map that models an environment using images captured with a camera and an augmented reality (AR) engine. The interior has at least one object with one or more planes that are parallel to each other. A method can include annotating the at least one image with a plurality of horizontal lines or vertical lines, each horizontal line or vertical line corresponding to an edge of the at least one object in at least one of the one or more planes, determining, an orientation of a projection plane that is parallel to each of the one or more planes, estimating an offset for each of the one or more planes relative to the projection plane, and rendering, based on the offset for each of the one or more planes, a two-dimensional orthographic map that models the interior environment.

19 Claims, 11 Drawing Sheets

MAPPING INTERIOR ENVIRONMENTS BASED ON MULTIPLE IMAGES

CROSS-REFERENCE TO RELATED APPLICATIONS

This application claims priority to U.S. Provisional patent application Ser. No. 63/288,341, filed on 10 Dec. 2021, the contents of which are hereby incorporated by reference in their entirety as if presented herein in full.

BACKGROUND

Accurate digital representations of a physical structure (e.g., house, room, building, and the like) can be used to facilitate efficient construction, maintenance, renovation planning, documentation, etc. The ability to accurately and efficiently build a two-dimensional (2D) model (similar to a blueprint) of a structure and/or associated environment can further reduce costs associated with a variety of applications.

As illustrated in FIG. 1A, a three-dimensional (3D) object 104 can be represented by a 2D orthographic projection 102, in which the object 104 is viewed along parallel lines 106 that are perpendicular to the plane of the drawing 108. For example, an orthographic projection of a house typically includes a top view, a front view, and a side view. Such orthographic projections of an environment/structure may be convenient for users who are familiar with blueprints.

For an orthographic projection, the size of an object's projection 102 does not depend on the distance of the object 104 to the projection plane 108. Therefore, to define an orthographic projection plane, one only needs to specify the direction of the projection plane's normal vector, and the distance of the plane is irrelevant since the projection will be the same no matter the object-to-plane distance. This distance invariance is in contrast to the more common perspective projections used to generate camera images (as will be discussed below with reference to FIG. 1B).

A side benefit of orthographic projections is that measurements in the projection plane can be accomplished by measuring simple linear distances. For example, if we want to know the width of an object in an orthographic projection map, its width may (in pixels) be measured on the map, which has some scale factor (pixels per foot for example). The actual width may be determined by multiplying the measurement by the (inverse of the) scale factor to directly yield the actual width of the object. As such, orthographic maps make measurement relatively straightforward, requiring only a single scalar value (the map's scale factor) to translate between on-map pixels and real-world measurements.

The above-referenced measurement procedure does not work for perspective projections, however. FIG. 1B illustrates a perspective projection 112 of a 3D structure 104. Here, the size of an object 104 on the projection plane 108 (i.e., the camera image) is dependent on the object's distance to the projection plane 108. The perspective projection 112 may be generated by tracing rays from corners/edges of the structure 104 through an image plane 108 to a point of view 110 of an imaging device. A perspective projection representation can be advantageous for a user to interpret because it typically includes perspective view information of an object of interest. However, the pixel scale of a perspective projection does not directly equate to the actual object of interest. For example, in addition to knowing the number of pixels that represent an object's dimension, we would also need to know the distance of the camera from the object, and we would also need to know the camera parameters (focal length, optical center, etc.) to convert the desired dimension of the object (in pixels, for example) to a real-world dimension of the object. Thus, one of the challenges associated with such isometric/perspective projections is that various surfaces/planes of the 3D structure 104 may be disposed at different depths and/or angles relative to the point of view 114 of the imaging device (such as a camera) and the dimensional and/or depth information of the 3D structure 104 may not be recovered from the perspective projection 112 alone.

Some existing implementations, such as discussed in U.S. Pat. No. 11,138,757, allow users to measure real-world distances on perspective images. For example, the user may be presented with a perspective image of a scene and is allowed to draw a line on the image. These systems then convert the drawn line to a real-world length. However, because of the nature of projective images, to make such measurements, such systems require a three-dimensional (3D) "backing model" (i.e., a 3D model of the structure shown in the image). To compute distances, a user-drawn line is ray-cast onto the underlying backing model, which yields 3D points for the ends of the line, which are then used to compute the final real-world point-to-point distance.

However, these types of measurements of objects on projective images can be undesirable. For example, user-drawn lines need to be drawn with respect to the natural planes of the scene (for example, to measure the width of an object, one needs to draw a line that is horizontal with respect to gravity down in the image. The user has to do the mental operation of approximating which direction gravity down is and approximating how the line would project itself along a vertical surface. While this is generally possible, especially for architectural scenes that contain many straight lines, it is desirable to avoid requiring this extra mental effort by the user. Another drawback is the requirement of the underlying 3D model of the scene geometry to ray-cast the user-drawn measurement line onto to object of interest. Since one does not know ahead of time which lines the user will draw, this 3D model must be permanently associated and carried around with the image for new measurements to take place.

A need exists for improved methods for mapping structures and environments using perspective images.

SUMMARY

Embodiments of the disclosed technology are directed to creating 2D orthographic models and/or maps of 3D structures using captured images of the 3D structures. In accordance with certain exemplary implementations of the disclosed technology, the 2D models may facilitate additional virtual measurements by the user without requiring the manipulation of a 3D view, which can prove to be easier for users who are familiar with blueprint-based operations.

A method is disclosed herein for modeling an environment. The method can include capturing, with a camera in communication with an augmented reality (AR) engine, at least one image of the interior environment, wherein the interior environment comprises a plurality of objects, each object having a surface oriented along a corresponding surface plane, wherein the surface planes are parallel to each other; annotating the at least one image with a plurality of orientation lines, each of the orientation lines corresponding to an edge of at least one object of the plurality of objects in at least one of the surface planes; determining, based on the plurality of orientation lines and information received from the AR engine, an orientation of a projection plane that is parallel to each of surface planes, wherein the projection plane is representative of a real-world size of the interior environment; estimating an offset for each of the surface planes relative to the projection plane; and rendering, based on the offset for each of the surface planes, a two-dimensional orthographic map that models the interior environment.

A system is disclosed herein that includes a computing device, comprising: a processor, memory in communication with the processor; a camera configured to capture digital images and store them in the memory; one or more position sensors; and an augmented reality (AR) framework executed by the computing device and in communication with the one or more position sensors and the camera. The computing device is configured to: capture, with the camera, at least one image of an interior environment, wherein the interior environment comprises a plurality of objects, each object having a surface oriented along a corresponding surface plane, and wherein the surface planes are parallel to each other; automatically annotate the at least one image with a plurality of orientation lines, each of the orientation lines corresponding to an edge of at least one object of the plurality of objects in at least one of the surface planes; determine, based on the plurality of orientation lines and information received from the AR framework, an orientation of a projection plane that is parallel to each of the surface planes, wherein the projection plane is representative of a real-world size of the interior environment; estimate an offset for each of the surface planes relative to the projection plane; and render, based on the offset for each of the surface planes, a two-dimensional orthographic map that models the interior environment.

The disclosed technology includes a non-transitory medium with instructions stored thereon that, when executed by a processor of a computing device, cause the computing device to perform operations including capturing, with a camera in communication with an augmented reality (AR) engine, at least one image of the interior environment, wherein the interior environment comprises a plurality of objects, each object having a surface oriented along a corresponding surface plane, wherein the surface planes are parallel to each other; annotating the at least one image with a plurality of orientation lines, each of the orientation lines corresponding to an edge of at least one object of the plurality of objects in at least one of the surface planes; determining, based on the plurality of orientation lines and information received from the AR engine, an orientation of a projection plane that is parallel to each of surface planes, wherein the projection plane is representative of a real-world size of the interior environment; estimating an offset for each of the surface planes relative to the projection plane; and rendering, based on the offset for each of the surface planes, a two-dimensional orthographic map that models the interior environment.

The disclosed technology may be understood and implemented with the aid of the following diagrams, which are not to scale.

DETAILED DESCRIPTION

Figure 1A:
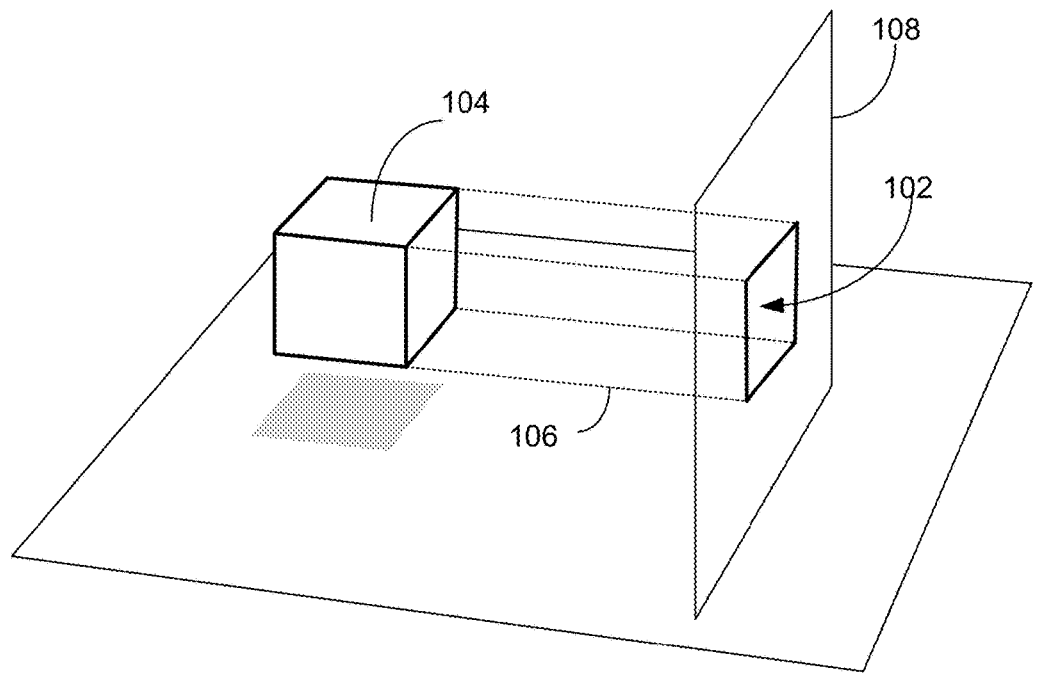
FIG. 1A shows an example of an orthographic projection of a 3D object.
Figure 1B:
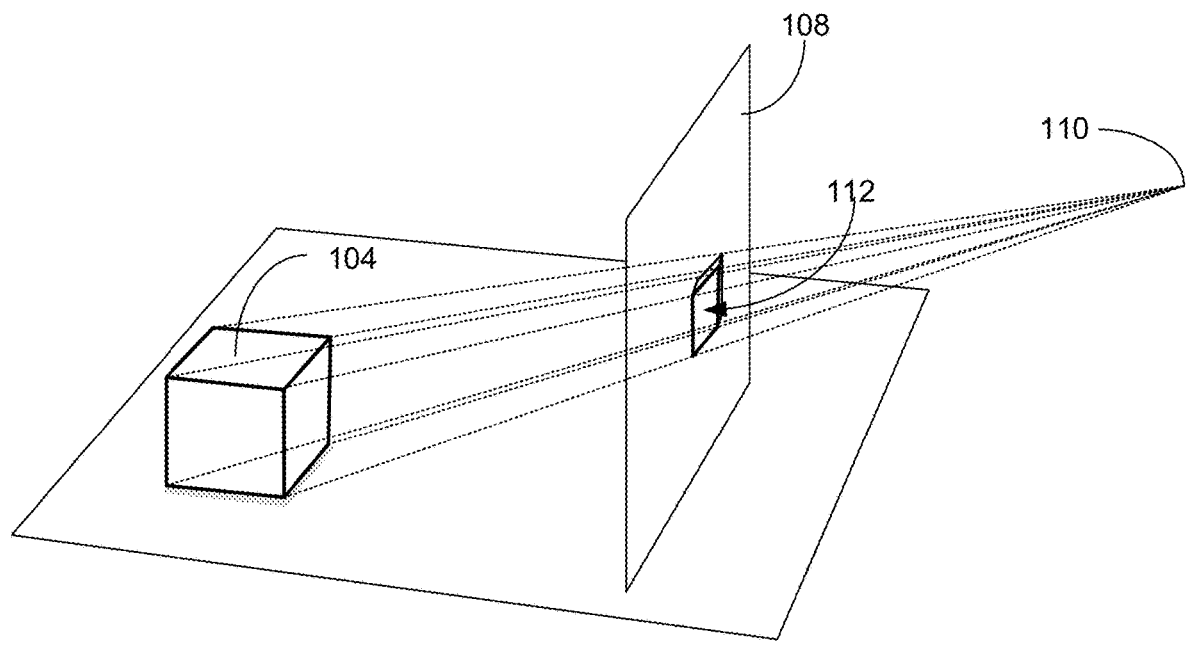
FIG. 1B depicts a perspective projection of a 3D object.

Certain exemplary implementations of the disclosed technology may be used to create two-dimensional (2D) orthographic maps/models of real-world three-dimensional (3D) scenes from images captured using a camera of a mobile device. The 2D maps/models of physical structures (e.g., objects in an interior environment) may enable a user to easily perform additional virtual measurements against the map/model, for example, to obtain the real-world dimensions of a particular region of the mapped/modeled structure.

Since Augmented Reality (AR) engines are widely available on modern mobile devices, certain implementations of the disclosed technology may utilize an AR engine to automatically capture relative positions and orientations (i.e., poses) of the camera in the world coordinate system while each of the images is captured. An AR engine (or framework) may utilize a combination of technologies, including: inertial sensors, such as accelerometers and gyroscopes, which may measure the movement and orientation of the device in space; one or more cameras of a mobile device, which may capture images of the environment around the mobile device; and computer vision techniques, which may analyze the images from the camera to identify objects and their positions in the environment. In certain exemplary implementations, digital content, such as text, point clouds, 3D models, etc., may be overlaid on top of, or otherwise associated with real-world objects in the camera's field of view.

In situations where the AR engine is not available, the relative pose of the cameras may be obtained by using any number of "relative pose from points" techniques. Relative pose from points is a technique used in computer vision to determine the relative orientation and position of objects based on the positions of corresponding points on each object. This technique can be used to align images of the same scene taken from different viewpoints, or to determine the position and orientation of an object in relation to another object. To use this technique, corresponding points are identified on both objects, either manually, or by using feature detection to automatically find distinctive points in the images. Once the corresponding points have been identified, the relative pose of the two objects can be calculated using a variety of mathematical techniques, such as the perspective-n-point algorithm or the five-point algorithm, which take into account the positions of the corresponding points and the intrinsic parameters of the camera (such as the focal length and the principal point) to determine the relative orientation and position of the two objects. In certain exemplary implementations, world coordinate capture positions and orientations of features associated with the captured images may be determined using such techniques.

In certain exemplary implementations, an AR engine may be utilized in conjunction with the disclosed technology to create two-dimensional (2D) orthographic maps/models of real-world three-dimensional (3D) scenes from images captured using a camera of a mobile device. In certain exemplary implementations, An AR framework may be provided by a commercially available AR engine that may execute on a mobile computing device and may perform visual inertial odometry using the computing device camera, processors, and motion/location sensors to track the surroundings and/or to sense how the computing device is moved around a space. An AR engine may use a combination of inertial sensors and a camera in a mobile device to track objects in images. Inertial sensors, such as accelerometers and gyroscopes, for example, may be used measure the device's movement and orientation in space. A camera on the mobile device may be used to captures images of the environment around the device. By combining information from the inertial sensors and the camera, the augmented reality engine can track the position and orientation of the device in relation to the objects in the environment. This allows the engine to overlay and/or associate digital content, point clouds, positions, etc., on objects/features in the camera's field of view.

Examples of currently available AR frameworks that may be utilized in conjunction with the disclosed technology are as discussed in the Apple Developer ARKit documentation (https://developer.apple.com/documentation/arkit/), or in the Google ARCore documentation (https://developers.google.com/ar/develop), each of which is incorporated herein by reference as if presented in full.

During image capture, certain exemplary implementations of the disclosed technology may utilize the AR engine running on the mobile device to simultaneously associate extracted information about the camera position, etc., with the captured images.

In certain exemplary implementations, the AR engine may be executed "in the background" by the operating system of the mobile computing device. In certain exemplary implementations, a separate computer program, as described herein, may acquire spatial information from the AR framework when needed. For example, the ARWorldTrackingConfiguration class of the ARKit may be invoked to track the computing device movement with six degrees of freedom in the three rotation axes (roll, pitch, and yaw), and three translation axes (movement in x, y, and z). The ARPositionalTrackingConfiguration class of the ARKit can enable 6 degrees of freedom tracking of the computing device by running the camera at the lowest possible resolution and frame rate Such device tracking information may be made available to the computer program executing on the computing device and may be utilized by the disclosed technology to detect the position of the computing device and (associated camera) while images are captured by the camera. In certain exemplary implementations, enhanced information regarding structures or objects in digital images may be used for many different purposes, including but not limited to structural measurements, object measurements, object recognition, detection of objects, detection of a condition of objects, safety hazards, etc.

Certain implementations of the disclosed technology may create one or more orthographic projections using one or more camera images. In certain exemplary implementations, a projection plane may be determined for projecting the orthographic projections. In accordance with certain exemplary implementations of the disclosed technology, a given projection plane may be described by a vector that is normal to the orthographic projection plane in the world space and may be defined by the AR engine.

In the case of a top-down map, the vector normal of a surface plane and/or projection plane is typically defined in the direction of gravity. Gravity acceleration, for example, is a very strong signal compared to the other accelerations a mobile device experiences, and as such, AR engines can easily determine "up" with high accuracy. Thus, most AR engines will automatically set the world's Y-axis to point upward against gravity. Thus, for a top-down orthographic projection, the plane normal may be expressed as N=[0,1,0].

Figure 2:
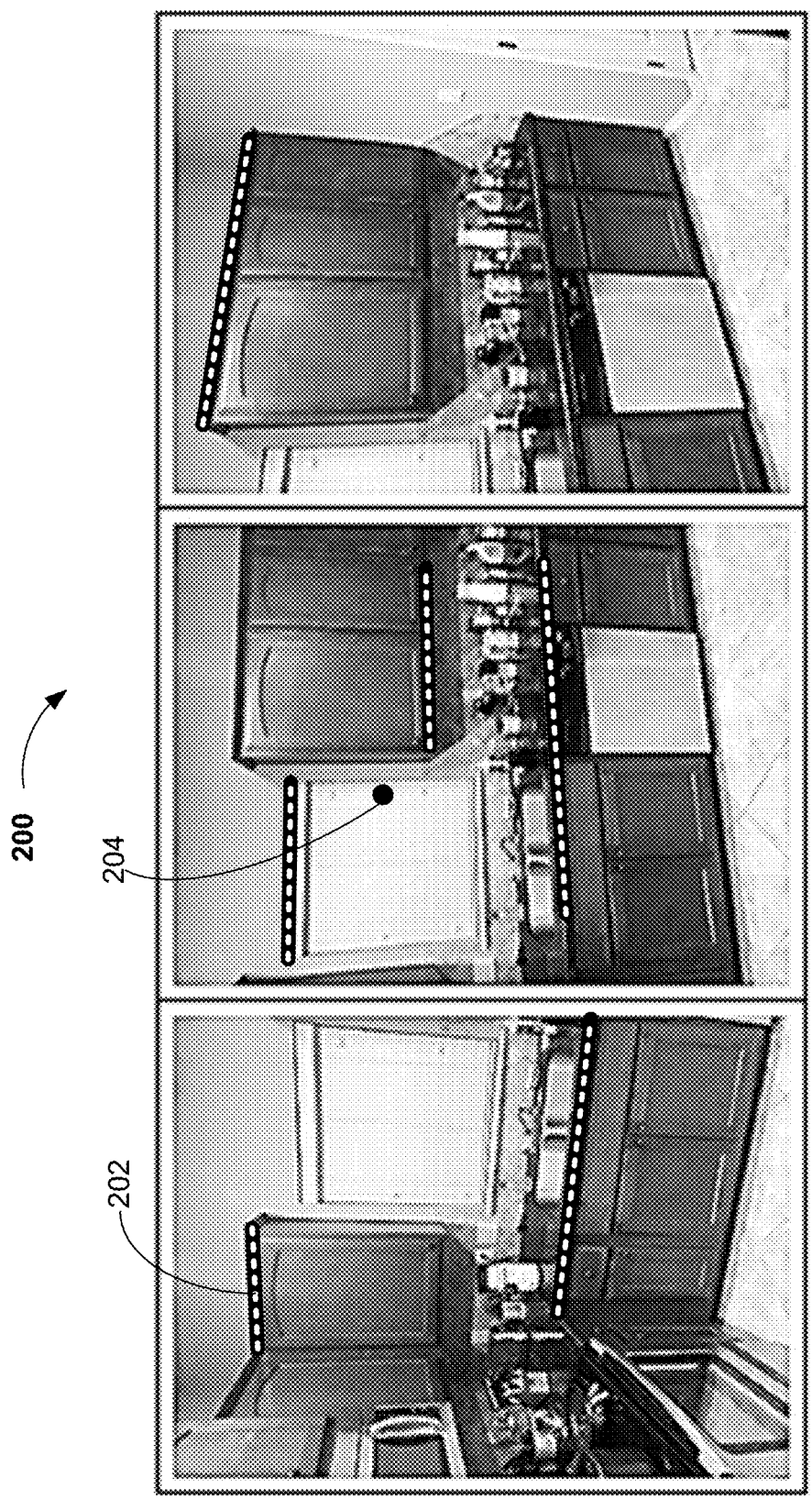
FIG. 2 depicts images of different views of an interior space (a kitchen) in which a few annotations (represented by dotted lines) are placed on horizontal edges of the associated structures, in accordance with certain exemplary implementations of the disclosed technology.

In certain exemplary implementations, an orthographic map of a scene may be projected against a vertical plane. FIG. 2, for example, depicts images of different views of an interior space (a kitchen). The scene captured in the images of FIG. 2 is largely composed of three different parallel planes (back wall, upper cabinets, and lower cabinets) which by definition share a common plane normal. Certain exemplary implementations of the disclosed technology may be utilized to create an orthographic map using such images by projecting this scene along this common plane normal.

In accordance with certain exemplary implementations of the disclosed technology, the captured images may be annotated by 2D lines 202 which are (1) orthogonal to gravity in the real world and (2) parallel to the desired projection plane. In the example illustrated in FIG. 2, since all three surfaces are parallel to the desired projection plane, the annotations 202 in this example may be made on any of the horizontal edges on the upper/lower cabinets or the back wall.

In certain exemplary implementations, such annotations 202 may be made by a human. However, in preferred embodiments, such annotations 202 may be determined by the use of deep networks specifically trained to recognize planes (such as surface planes) in perspective images, as discussed in "PlaneRCNN: 3D Plane Detection and Reconstruction From a Single Image" Liu et al.; Proceedings of the IEEE/CVF Conference on Computer Vision and Pattern Recognition (CVPR), 2019, pp. 4450-4459, which is incorporated herein by reference as if presented in full.

The annotations 202 (for example, as depicted in FIG. 2), may specify lines parallel to the projection plane in 2D image space and may be used to solve for the 3D world space direction of the projection plane normal N. To accomplish this, the above-referenced AR engine may be utilized to obtain the source-image camera positions/orientations (for example, during image capture). In certain exemplary implementations, the AR engine may be used to place a pivot point 204 in front of the camera(s) and far enough away to be visible from all source-image camera locations. In certain exemplary implementations, a "test projection plane" may be placed to intersect this pivot point 204, and a correct rotation of this "test plane" may be determined that best matches the real-world desired projection plane.

Figure 3B:
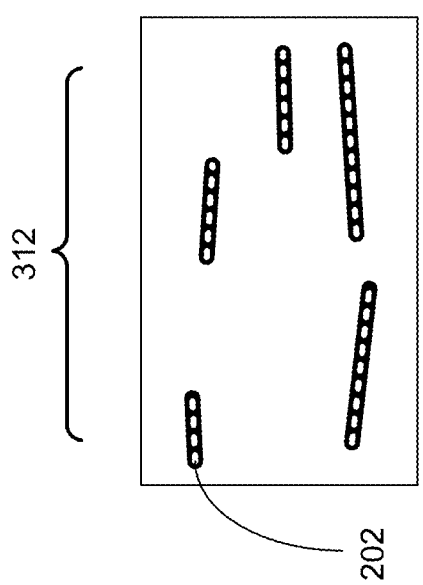
FIG. 3B shows annotations (as depicted in FIG. 2, but without the images of the corresponding interior space), which illustrates that although horizontal edges were annotated, the perspective views of a space (from the perspective of the camera) can make such horizontal edges appear non-parallel with each other.
Figure 3C:
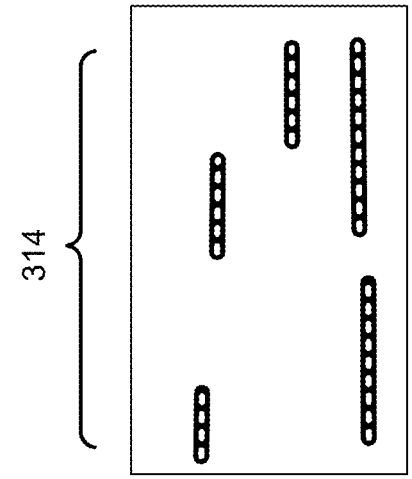
FIG. 3C illustrates an end result of a process in which test planes (as illustrated in FIG. 3A and corresponding to the annotations) may be searched and/or rotated so that the corresponding annotation(s) will be parallel with one another (and horizontal in this case).
Figure 3A:
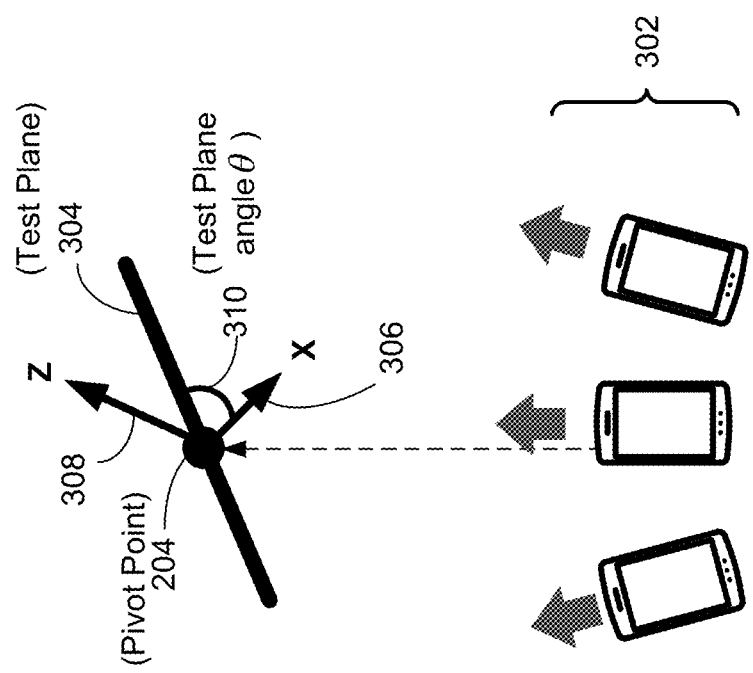
FIG. 3A depicts camera positions and a pivot point intersected by a test plane, in accordance with certain exemplary implementations of the disclosed technology.

FIG. 3A depicts example camera positions/orientations 302 that may correspond to the respective images shown in FIG. 2. FIG. 3A also depicts the pivot point 204 intersected by a test plane 304. The test plane 304 may be referenced by the world axis X 306 and the world axis Z 308 (assuming that the Y axis is pointing up, opposite of gravity) in accordance with certain exemplary implementations of the disclosed technology. Also illustrated in FIG. 3A is a test plane angle θ that may be varied to find the optimum angle $\theta_{opt}$ such that when the test plane angle θ matches the real-world angle of the projection plane, the projected lines 202 will be parallel and horizontal.

FIG. 3B shows annotations (as depicted in FIG. 2, but without the images of the corresponding interior space), which illustrates that although horizontal edges were annotated, the isometric views of a space (from the perspective of the camera) can make such horizontal edges appear non-parallel with each other. In accordance with certain exemplary implementations of the disclosed technology, and as discussed above, 2D plane lines in the images may be annotated 202 so that they are orthogonal to gravity and parallel to the projection plane. As such, when the test plane angle matches the real-world angle of the projection plane, the projected lines will be parallel and horizontal.

FIG. 3C illustrates a result of a process in which test planes 304 (as illustrated in FIG. 3A and corresponding to the annotations 202) may be searched over the optimum angle $\theta_{opt}$ and/or rotated accordingly so that the corresponding annotation(s) will be parallel with one another (and horizontal in this case). For example, using the camera positions/orientations 302 and camera parameters supplied by the AR engine, implementations of the disclosed technology may be used to project the annotated lines 202 from the source images onto the test plane 304. Certain exemplary implementations of the disclosed technology may utilize the Y-coordinates of the projected lines and use a numerical optimizer to search for the optimum test plane angle $\theta_{opt}$ that minimizes the differences in the Y-coordinates of the endpoints of each line. Certain numerical optimization processes and algorithms that may be utilized to find the optimum test plane angle $\theta_{opt}$ are known by those having skill in the art and can be found in "Numerical Optimization," Nocedal and Wright, $2^{nd}$ Edition, 2006 Springer, New York, which is incorporated herein by reference as if in full.

Once the optimum angle $\theta_{opt}$ is found, it can be utilized to construct a real-world projection plane normal N such that $$N=\{\cos(\theta_{opt}), 0, \sin(\theta_{opt})\}. \tag{1}$$

This projection plane normal N specifies the projection plane that may then be utilized for generating an orthographic map of the features in a scene (for example, a wall, upper cabinets, lower cabinets) that will be projected to this projection plane. Embodiments of the disclosed technology may utilize the 3D locations of the various objects depicted in the source images to be able to project those locations correctly onto the projection plane.

In the case of most architectural scenes such as indoor spaces, a simplification may be used where the geometry of the item(s) or feature(s) in the scene that we wish to project will be planar and parallel to the projection plane. In most cases, this is not a restrictive assumption because most architectural scenes will typically have many planar surfaces aligned with the major axes of the structure. With the assumption that our scene is composed of surface planes that are parallel to the projection plane, the disclosed technology may be used to (a) determine where these different surface plane regions are in the source images; and (b) determine the 3D world position of these regions. While each of the regions of interest that we wish to project to the projection plane may be assumed to be parallel to the projection plane, they may potentially have different offsets from the projection plane.

Figure 4A:
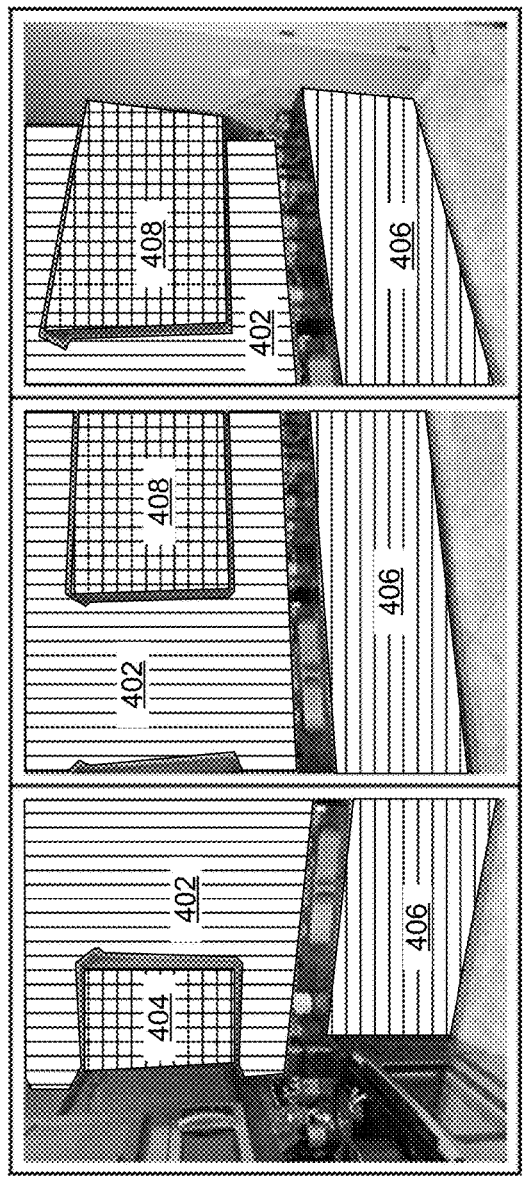
FIG. 4A depicts images of different views of an interior space (as shown in FIG. 2) in which the front surfaces corresponding to surface planes of the various features may be projected to a projection plane, in accordance with certain exemplary implementations of the disclosed technology.

FIG. 4A depicts images of different views of an interior space (as shown in FIG. 2) in which the front surfaces of the various features may be projected to the projection plane, in accordance with certain exemplary implementations of the disclosed technology. In this example the back wall 402 may have an associated first offset from the desired projection plane; the upper left cabinet portion 404 and the upper right cabinet portion 408 may have an associated second offset, and the lower cabinets 406 may have an associated third offset, where each of these regions may be parallel with the projection plane. In accordance with certain exemplary implementations of the disclosed technology, the pixel regions of these different offset features may be annotated, as shown in FIG. 4A. In certain exemplary implementations, these annotations may be done by hand. However, in preferred embodiments, these annotations may be automatically performed, for example, using a deep neural network trained to recognize planar regions, as discussed in "PlaneRCNN: 3D Plane Detection and Reconstruction From a Single Image" Liu et al.; Proceedings of the IEEE/CVF Conference on Computer Vision and Pattern Recognition (CVPR), 2019, pp. 4450-4459, which is incorporated herein by reference as if presented in full.

Figure 4B:
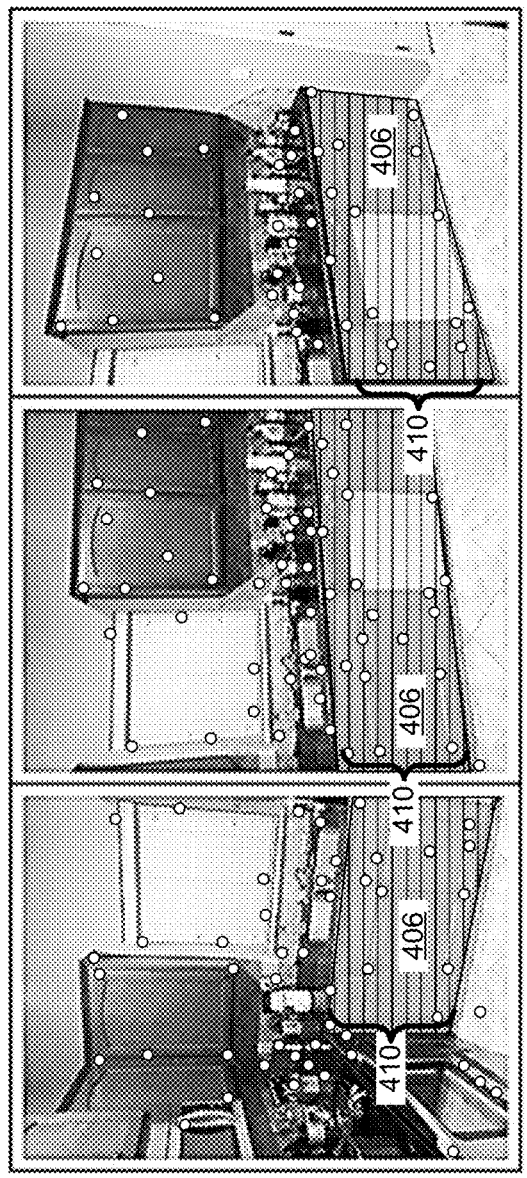
FIG. 4B depicts images of different views of an interior space (as shown in FIG. 2 and corresponding to the illustration in FIG. 4A) in which the offset of the various surfaces may be determined by using a point cloud, in accordance with certain exemplary implementations of the disclosed technology.

FIG. 4B depicts images of different views of an interior space (as shown in FIG. 2 and corresponding to the illustration in FIG. 4A) in which the offset of the various surfaces in the imaged scene may be determined by using a point cloud, in accordance with certain exemplary implementations of the disclosed technology. Specifically, we wish to determine the offset of each annotated planar region (402, 404, 406, 408, for example) by using a point cloud. Such a point cloud may be produced by AR engine operation. For example, the AR engine may maintain an internal collection of 3D landmark points 410 for which to navigate. For more robustness, additional optical flow techniques can be used to produce a more dense point cloud.

In accordance with certain implementations, the estimated positions of the points in 3D space may be tracked together with the corresponding 2D coordinates in the source image. As also illustrated in FIG. 4B, for each offset planar region, a subset of the point cloud that is contained in that region may be selected. In the case of the lower cabinet region 406, for example, the subset points 410 which fall within the bottom cabinet region 406 may be selected. In accordance with certain exemplary implementations of the disclosed technology, the 3D positions of the selected points 410 may be projected along the optimal projection normal N (see equation 1 above) and a histogram of the resulting distances may be plotted. In certain implementations, a normal distribution may be fitted to the histogram of the raw point cloud data for the selected region, and the mean of the distribution may be determined to provide an estimate for the distance from the selected region to the origin of the projection plane.

Figure 5:
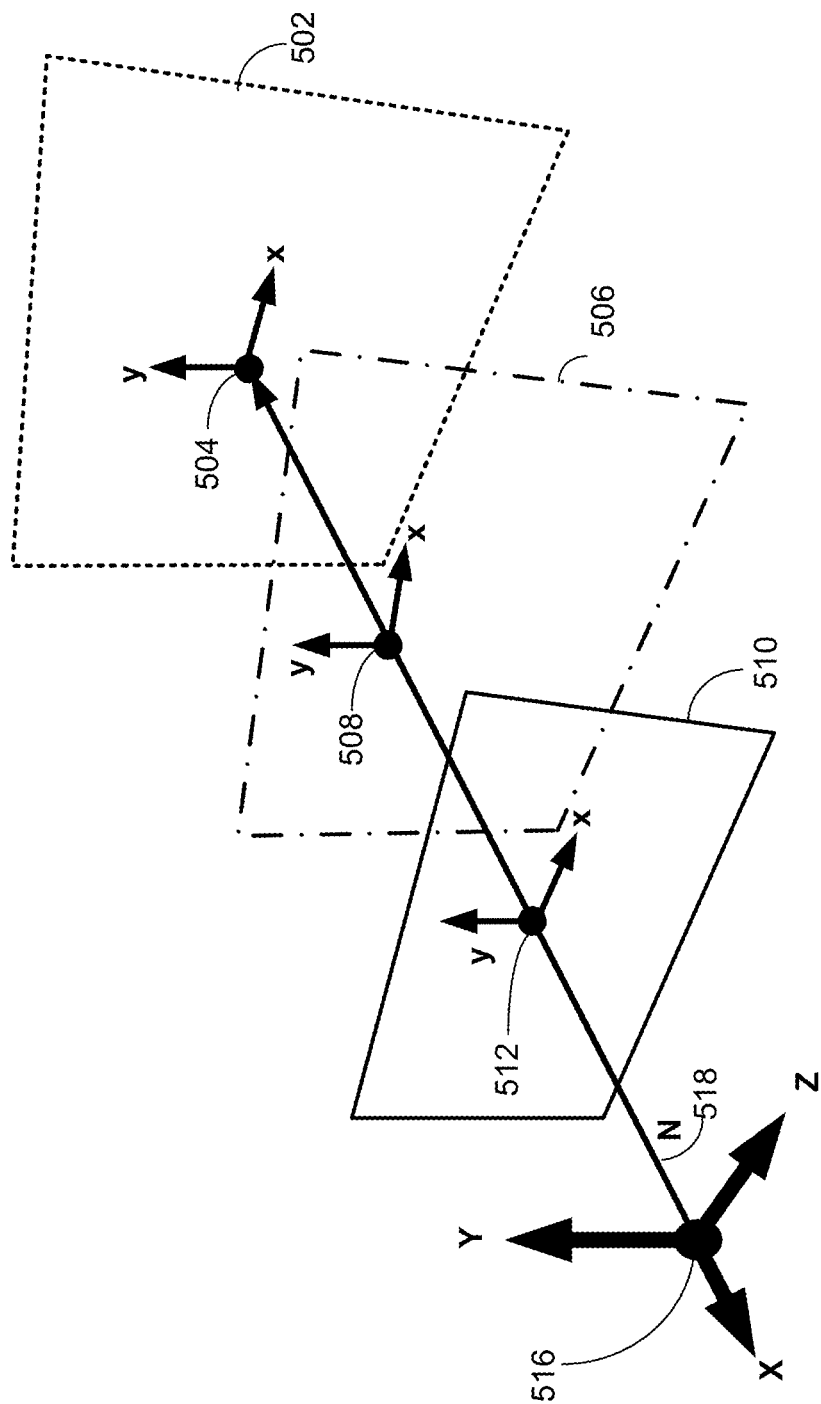
FIG. 5 depicts the estimated mean distances of the selected annotated region to the origin of the projection plane, in accordance with certain exemplary implementations of the disclosed technology.

As depicted in FIG. 5, the above-referenced procedure may be repeated for each of the annotated planar regions. For example, the points in a particular annotated planar region may be selected, projected along the optimal projection normal N 518, and fitted with a normal distribution to estimate the mean distance of the points from the selected region to the origin 516 of the projection plane. In the example case of the kitchen as discussed above with respect to FIGS. 2-4B, the annotated planar regions can correspond to the surface plane of back wall 502, which may have an estimated first offset 504 from the origin 516 of the desired projection plane; the common surface plane upper left cabinet portion and the upper right cabinet portion 506, which both may have an estimated second offset 508 from the origin 516 of the desired projection plane; and the surface plane of the lower cabinet 510, which may have an estimated third offset 512 from the origin 516 of the desired projection plane. In this example, we may estimate the three different depths/offsets 504, 508, 512, one for each selected plane 502, 506, and 510.

Figure 6B:
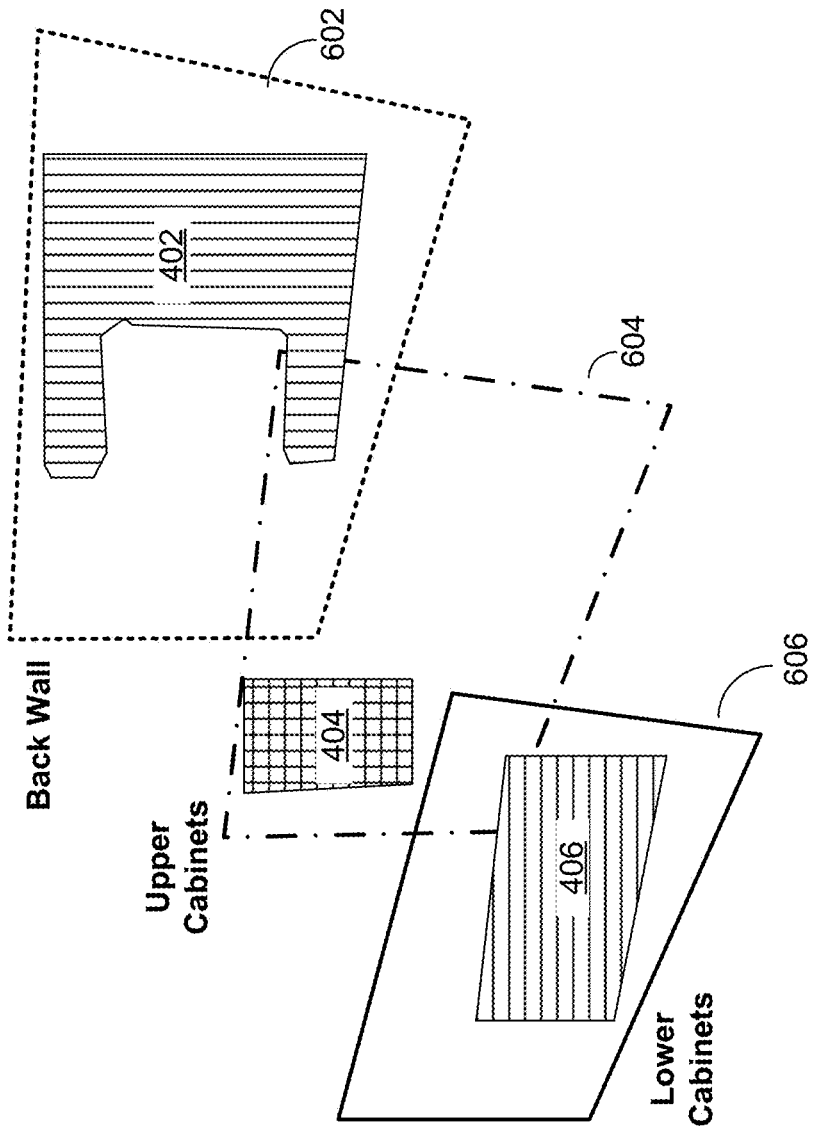
FIG. 6B depicts world space virtual rendering planes that may be created based on the estimated distances for each corresponding selected and annotated region, in accordance with certain exemplary implementations of the disclosed technology.
Figure 6A:
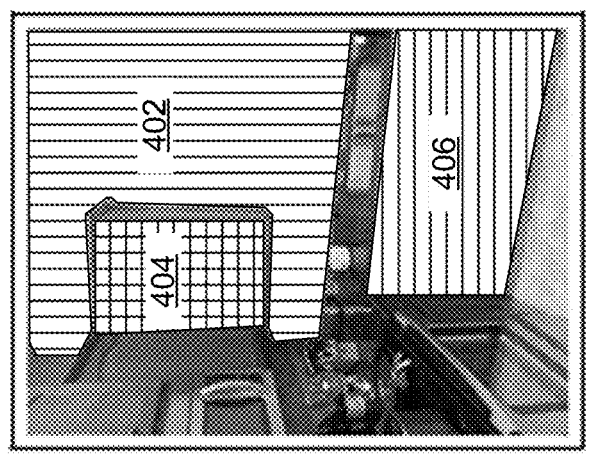
FIG. 6A illustrates selected annotated regions for a given image (such as the leftmost image depicted in FIG. 4A)

As illustrated in FIG. 6A and FIG. 6B, and according to certain exemplary implementations, world space virtual rendering planes 602, 604, and 606 may be created based on the estimated distances, as discussed above for each corresponding selected and annotated regions 402, 404, and 406. In certain exemplary implementations, each rendering plane 602, 604, and 606 may have an associated 2D local coordinate system. In accordance with certain exemplary implementations of the disclosed technology, a given rendering plane's local origin may be defined by the intersection of the projection normal N (for example, N 518 as illustrated in FIG. 5) with each rendering plane 602, 604, 606. According to an exemplary implementation of the disclosed technology, the rendering planes 602, 604, and 606 may all share a common local Y axis ("up", identical to the world Y axis), and a common local X-axis defined by the cross-product of the projection normal and the Y axis.

Figure 7B:
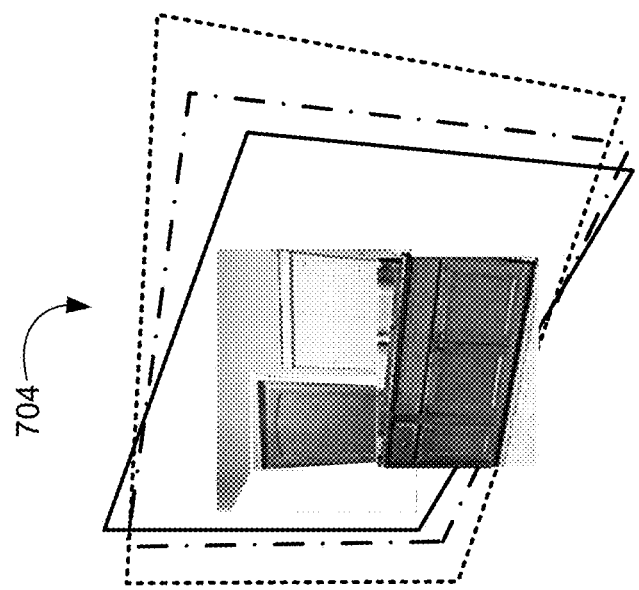
FIG. 7B illustrates orthographically projecting each of the rendering planes (as shown in FIG. 7A) onto the projection plane to create an orthographic map, in accordance with certain exemplary implementations of the disclosed technology.
Figure 7A:
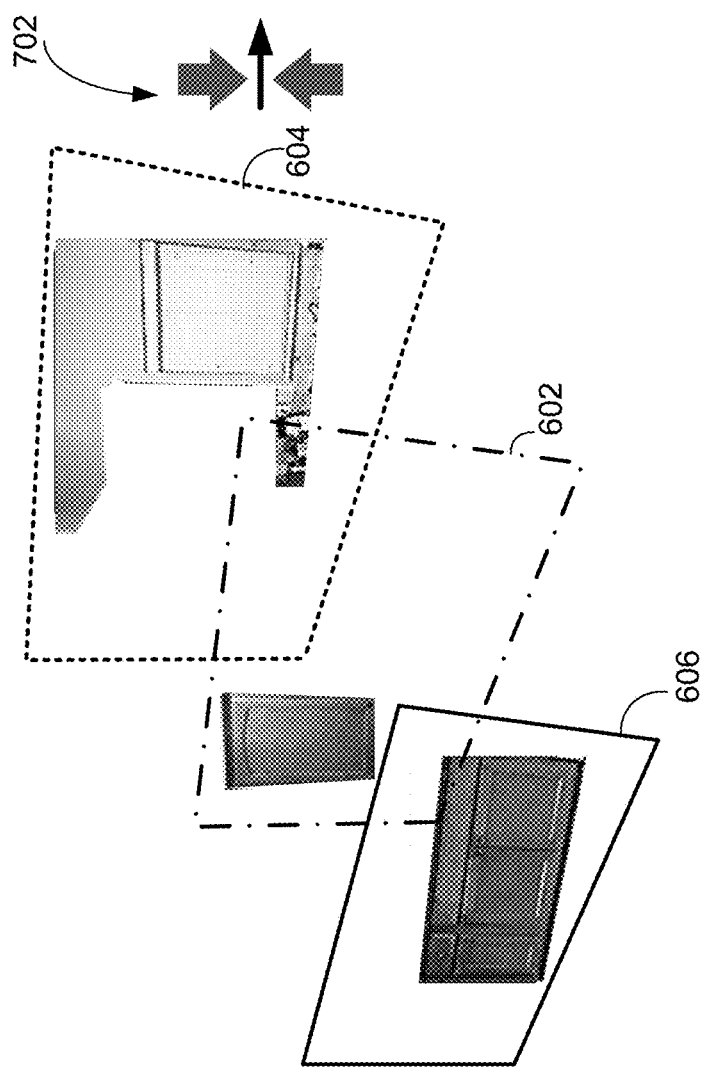
FIG. 7A illustrates a rendering of a source image (such as the left-most source image depicted in FIG. 4A), where vertices of each annotated region may be projected onto the appropriate rendering plane, in accordance with certain exemplary implementations of the disclosed technology.

As depicted in FIG. 7A, for each source image (such as the three source images depicted in FIG. 4A), vertices of each annotated region may be projected onto the appropriate rendering plane (for example, 602, 604, 606).

FIG. 7B illustrates orthographically projecting each of the rendering planes (as shown in FIG. 7A) onto the projection plane to create an orthographic map 704, in accordance with certain exemplary implementations of the disclosed technology. Each projected point may correspond to a coordinate in the rendering plane's local coordinate system. At this stage, each rendering plane's local coordinate system may correspond to the world units of the AR engine (meters). However, our desired output of this map 704 may be a pixel-based orthographic map image. In certain exemplary implementations, the local rendering plane coordinate system may be converted, and all coordinates may be multiplied by the desired final map's scale. Generally, this scaling may be expressed in terms of a pixels-per-meters value (e.g., how many pixels we want a length of 1 meter to take up on the final orthographic map image).

As discussed above, since the projected region coordinates are now in terms of pixels (after the multiplication by the scale factor), a homography 702 may be defined between the image space of the source images and the local pixel-based coordinate system of each rendering plane. The result at this point is that the rendering planes may be effectively pixel-based images since their local coordinate system has been converted into pixels via the scale factor multiplication. In certain exemplary implementations, this homography 702 may be used to densely map the pixels from each annotated sub-region to the appropriate rendering plane image. Geometrically, this has the effect of simply smashing all the rendering planes together. Practically, however, this step may be performed by first rasterizing each of the rendering planes to a pixel-based bitmap, then overlaying and aligning each of the bitmaps, as illustrated in FIG. 7B. After rasterization, the process may include overlaying each rendering plane's bitmap image on top of each other, starting with the back-most rendering plane first and working forward. Certain implementations may ensure alignment of the rendering plane images while the origins of their local coordinate systems coincide in the final output.

Figure 8:
FIG. 8 illustrates an example of a generated pixel-based orthographic map 800, in which visual measurements can be made, in accordance with certain exemplary implementations of the disclosed technology.

FIG. 8 illustrates the result of the above-mentioned processes, which may be a 2D, orthographic map 800 of the regions from the source images. FIG. 8 also illustrates examples of visual measurements that can be made based on the resulting orthographic map 800, in accordance with certain exemplary implementations of the disclosed technology. In this example, the scene was rendered using a scale of 200 pixels per meter (PPM), and it enables a user to measure anything visible on this map by simply drawing a line on the image, measuring the distance in pixels, and converting into meters by multiplying by the PPM scale factor. As illustrated in FIG. 8, the pixel (px)-to-length values (in inches for this example) may be derived from line measurements using the orthographic map 800. FIG. 8 also illustrates the line measurement values vs. the ground truth (g.t.) measured values of the actual object.

Figure 9:
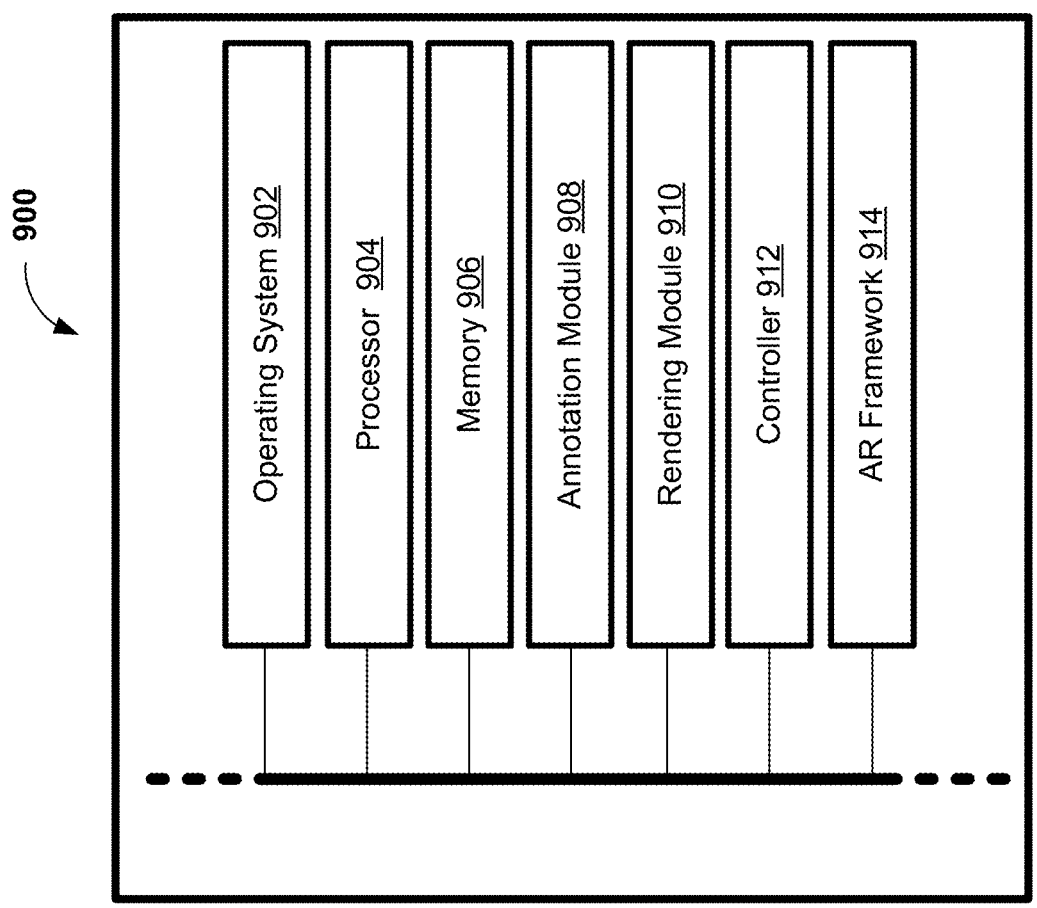
FIG. 9 is a block diagram representation of a portion of an apparatus that can be configured to implement some embodiments of the disclosed technology.

FIG. 9 is a block diagram representation of a portion of an apparatus 900 that can be configured to implement some embodiments of the disclosed technology. The hardware platform 900 may include an operating system 902, and a processor 904 that can execute code to implement a method described herein (e.g., method 1100 shown in FIG. 11). The hardware platform 900 may include a memory 906 that may be used to store processor-executable code and/or store data. The hardware platform 900 may further include an annotation module 908 and a rendering module 910, which may be configured to implement the orthographic projection generation methods described herein. In some embodiments, some portion or all of the annotation module 908, the rendering module 910, and/or the controller 912 may be implemented in the processor 904. In other embodiments, the memory 906 may comprise multiple memories, some of which are exclusively used by the annotation module, the rendering module, and/or the controller. The hardware platform 900 may further include a controller 912. For example, the controller 908 may implement one or more scheduling or routing algorithms described herein. The hardware platform 900 may further include (or be in communication with) an AR Framework 914. For example, the controller AR Framework 914 may be used to determine the camera location/orientation functions, the point cloud function, etc., as discussed herein.

Figure 10:
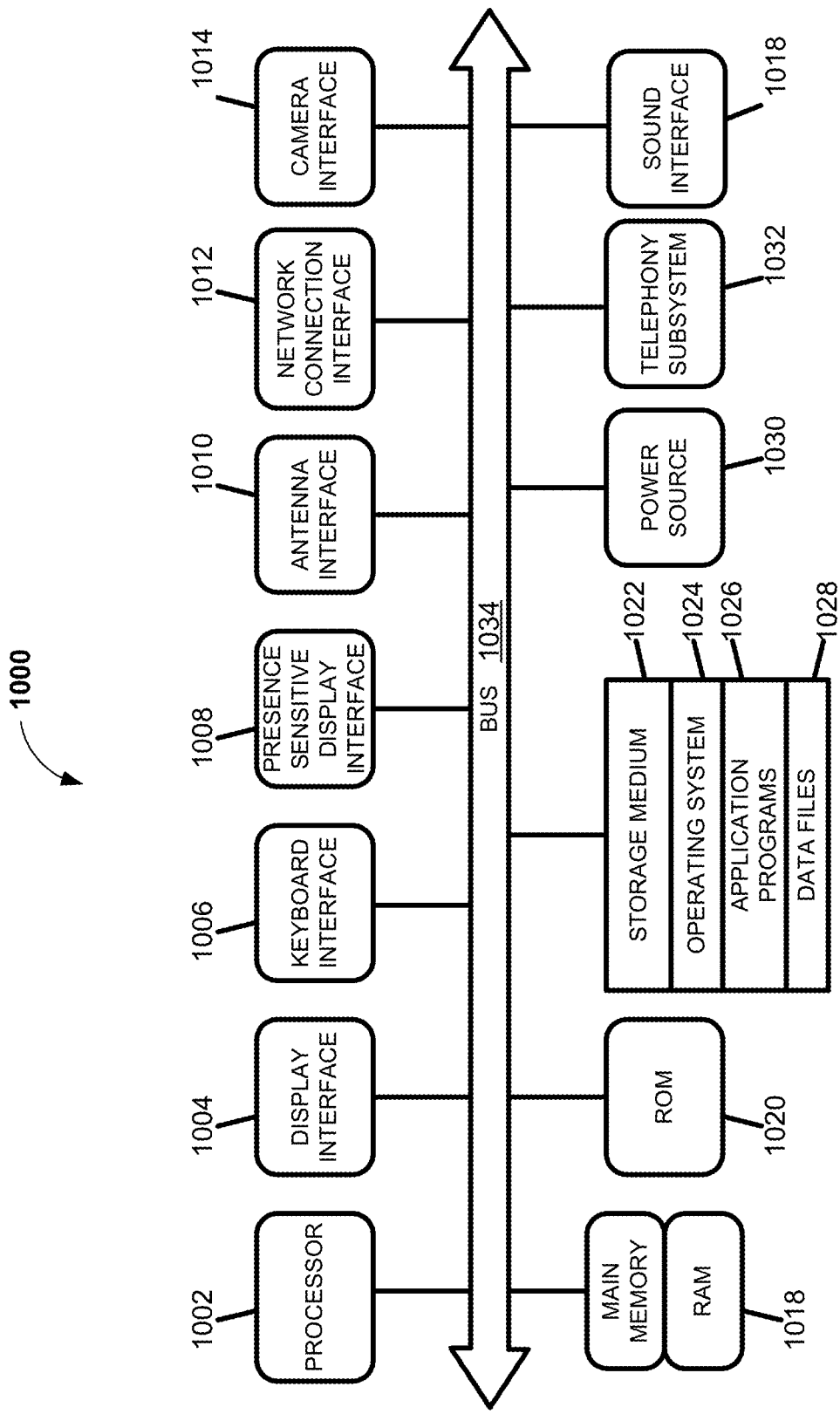
FIG. 10 is a block diagram representation of a computing system that can be configured to implement some embodiments of the disclosed technology.

FIG. 10 is a block diagram representation of a computing system that can be configured to implement some embodiments of the disclosed technology. FIG. 10 depicts a block diagram of an illustrative computing device 1000 that may be utilized to enable certain aspects of the disclosed technology. Various implementations and methods herein may be embodied in non-transitory computer-readable media for execution by a processor. It will be understood that the computing device 1000 is provided for example purposes only and does not limit the scope of the various implementations of the communication systems and methods.

The computing device 1000 of FIG. 10 includes one or more processors where computer instructions are processed. The computing device 1000 may comprise the processor 1002, or it may be combined with one or more additional components shown in FIG. 10. In some instances, a computing device may be a processor, controller, or central processing unit (CPU). In yet other instances, a computing device may be a set of hardware components.

The computing device 1000 may include a display interface 1004 that acts as a communication interface and provides functions for rendering video, graphics, images, and texts on the display. In certain example implementations of the disclosed technology, the display interface 1004 may be directly connected to a local display. In another example implementation, the display interface 1004 may be configured for providing data, images, and other information for an external/remote display. In certain example implementations, the display interface 1004 may wirelessly communicate, for example, via a Wi-Fi channel or other available network connection interface 1012 to the external/remote display.

In an example implementation, the network connection interface 1012 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 1004 may be operatively coupled to a local display. In another example, the display interface 1004 may wirelessly communicate, for example, via the network connection interface 1012 such as a Wi-Fi transceiver to the external/remote display.

The computing device 1000 may include a keyboard interface 1006 that provides a communication interface to a keyboard. According to certain example implementations of the disclosed technology, the presence-sensitive display interface 1008 may provide a communication interface to various devices such as a pointing device, a touch screen, etc.

The computing device 1000 may be configured to use an input device via one or more of the input/output interfaces (for example, the keyboard interface 1006, the display interface 1004, the presence-sensitive display interface 1008, the network connection interface 1012, camera interface 1014, sound interface 1016, etc.,) to allow a user to capture information into the computing device 1000. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 1000 or may be a separate device. For example, the input device may be an accelerometer, a magnetometer, a digital camera, a microphone, and an optical sensor.

Example implementations of the computing device 1000 may include an antenna interface 1010 that provides a communication interface to an antenna; a network connection interface 1012 that provides a communication interface to a network. According to certain example implementations, the antenna interface 1010 may utilize to communicate with a Bluetooth transceiver.

In certain implementations, a camera interface 1014 may be provided that acts as a communication interface and provides functions for capturing digital images from a camera. In certain implementations, a sound interface 1016 is provided as a communication interface for converting sound into electrical signals using a microphone and for converting electrical signals into sound using a speaker. According to example implementations, random-access memory (RAM) 1018 is provided, where computer instructions and data may be stored in a volatile memory device for processing by the CPU 1002.

According to an example implementation, the computing device 1000 includes a read-only memory (ROM) 1020 where invariant low-level system code or data for basic system functions such as basic input and output (I/O), startup, or reception of keystrokes from a keyboard are stored in a non-volatile memory device. According to an example implementation, the computing device 1000 includes a storage medium 1022 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1024, application programs 1026 (including, for example, a web browser application, a widget or gadget engine, and or other applications, as necessary) and data files 1028 are stored. According to an example implementation, the computing device 1000 includes a power source 1030 that provides an appropriate alternating current (AC) or direct current (DC) to power components. According to an example implementation, the computing device 1000 includes a telephony subsystem 1032 that allows the device 1000 to transmit and receive sound over a telephone network. The constituent devices and the CPU 1002 communicate with each other over a bus 1034.

In accordance with an example implementation, the CPU 1002 has an appropriate structure to be a computer processor. In one arrangement, the computer CPU 1002 may include more than one processing unit. The RAM 1018 interfaces with the computer bus 1034 to provide quick RAM storage to the CPU 1002 during the execution of software programs such as the operating system application programs, and device drivers. More specifically, the CPU 1002 loads computer-executable process steps from the storage medium 1022 or other media into a field of the RAM 1018 to execute software programs. Data may be stored in the RAM 1018, where the data may be accessed by the computer CPU 1002 during execution. In one example configuration, the device 1000 includes at least 128 MB of RAM, and 256 MB of flash memory.

The storage medium 1022 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 1000 to access computer-executable process steps, application programs, and the like, stored on removable and non-removable memory media, to off-load data from the device 1000 or to upload data onto the device 1000. A computer program product, such as one utilizing a communication system may be tangibly embodied in storage medium 1022, which may comprise a machine-readable storage medium.

According to one example implementation, the term computing device, as used herein, may be a CPU, or conceptualized as a CPU (for example, the CPU 1002 of FIG. 10). In this example implementation, the computing device (CPU) may be coupled, connected, and/or in communication with one or more peripheral devices.

Figure 11:
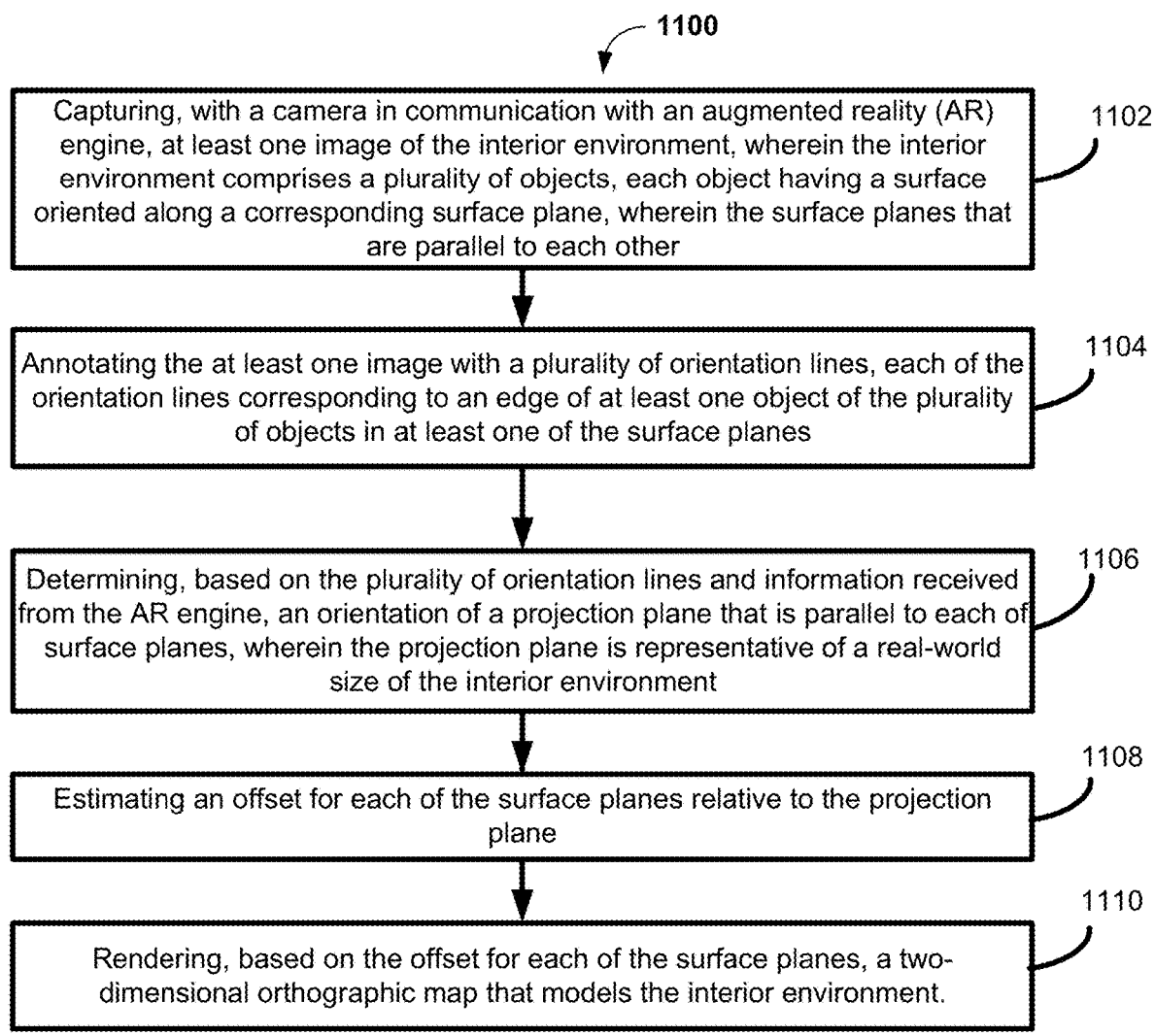
FIG. 11 is a flow diagram of an example method according to embodiments of the presently disclosed technology.

FIG. 11 is a flow diagram of an example method modeling an interior environment comprising an object. In block 1102, the method 1100 includes capturing, with a camera in communication with an augmented reality (AR) engine, at least one image of the interior environment, wherein the interior environment comprises a plurality of objects, each object having a surface oriented along a corresponding surface plane, wherein the surface planes are parallel to each other. In block 1104, the method 1100 includes annotating the at least one image with a plurality of orientation lines, each of the orientation lines corresponding to an edge of at least one object of the plurality of objects in at least one of the surface planes. In block 1106, the method 1100 includes determining, based on the plurality of orientation lines and information received from the AR engine, an orientation of a projection plane that is parallel to each of surface planes, wherein the projection plane is representative of a real-world size of the interior environment. In block 1108, the method 1100 includes estimating an offset for each of the surface planes relative to the projection plane. In block 1110, the method 1100 includes rendering, based on the offset for each of the surface planes, a two-dimensional orthographic map that models the interior environment.

In certain exemplary implementations, capturing the at least one image comprises utilizing the AR engine to automatically capture relative positions and orientations of the camera in a world coordinate system while the at least one image is captured.

In certain implementations, the annotating may be performed based on human input. In other embodiments, the annotating may be performed using a deep-learning neural network.

In accordance with certain exemplary implementations of the disclosed technology, estimating the offset is based on generating a point cloud for objects in at least one of the surface planes. In certain implementations, the point cloud may be generated using an optical flow algorithm. In certain implementations, the point cloud may be generated by the AR engine.

In certain exemplary implementations, the rendering can include using a scale factor that converts pixels to a real-world unit of length. In certain exemplary implementations, the real-world unit of length may be a meter. In certain exemplary implementations, the real-world unit may be a foot. In certain exemplary implementations, the real-world unit may be a centimeter. In certain exemplary implementations, the real-world unit may be a yard. Other similar units of measure may be used to define the real-world unit without departing from the scope of the disclosed technology.

In certain exemplary implementations, determining the orientation of the projection plane can include using a numerical optimizer to minimize differences in coordinates of endpoints of the plurality of orientation lines.

In certain exemplary implementations, each of the orientation lines may be substantially horizontal lines or substantially vertical lines.

In some embodiments, determining the orientation of the projection plane can include using a numerical optimizer to minimize differences in (a) Y-coordinates of endpoints of the plurality of horizontal lines and/or (b) X-coordinates of endpoints of the plurality of vertical lines.

Certain implementations can further include generating, with the AR engine, a pivot point in a common visible position of each image of the at least one image and determining an optimum rotation angle $\theta_{opt}$ of a test plane that intersects with the pivot point such that the test plane matches the projection plane.

Certain exemplary implementations of the disclosed technology can include comprising constructing a real-world projection plane normal $N=\{\cos(\theta_{opt}), 0, \sin(\theta_{opt})\}$ that specifies the projection plane.

In accordance with certain exemplary implementations of the disclosed technology, the rendering includes generating a plane having a local origin defined by an intersection plane with the real-world projection plane normal N.

Implementations of the subject matter and the functional operations described herein can be implemented in various systems, digital electronic circuitry, or in computer software, firmware, or hardware, including the structures, disclosed in this specification and their structural equivalents, or in combinations of one or more of them. Implementations of the subject matter described herein can be implemented as one or more computer program products, i.e., one or more modules of computer program instructions encoded on a tangible and non-transitory computer-readable medium for execution by, or to control the operation of a data processing apparatus. The computer-readable medium can be a machine-readable storage device, a machine-readable storage substrate, a memory device, a composition of matter affecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other units suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media, and memory devices, including by way of example semiconductor memory devices, e.g., EPROM, EEPROM, and flash memory devices. The processor and the memory can be supplemented by, or incorporated into, special-purpose logic circuitry.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described herein, and other implementations, enhancements, and variations can be made based on what is described herein and illustrated in the accompanying figures.

What is claimed:

1. A method of modeling an interior environment, comprising:
   capturing, with a camera in communication with an augmented reality (AR) engine, at least one image of the interior environment, wherein the interior environment comprises a plurality of objects, each object having a surface oriented along a corresponding surface plane, wherein the surface planes are parallel to each other;
   annotating the at least one image with a plurality of orientation lines, each of the orientation lines corresponding to an edge of at least one object of the plurality of objects in at least one of the surface planes;
   determining, based on the plurality of orientation lines and information received from the AR engine, an orientation of a projection plane that is parallel to each of surface planes, wherein the projection plane is representative of a real-world size of the interior environment;
   estimating an offset for each of the surface planes relative to the projection plane; and
   rendering, based on the offset for each of the surface planes, a two-dimensional orthographic map that models the interior environment; and
   constructing a real-world projection plane normal N={cos($\theta_{opt}$), 0, sin($\theta_{opt}$)} that specifies the projection plane, and wherein the rendering includes generating a plane having a local origin defined by an intersection plane with of the real-world projection plane normal N.

2. The method of claim 1, wherein capturing the at least one image comprises utilizing the AR engine to automatically capture relative positions and orientations of the camera in a world coordinate system while the at least one image is captured.

3. The method of claim 1, wherein the rendering comprises using a scale factor that converts pixels of the orthographic map to a real-world unit of length.

4. The method of claim 3, further comprising extracting and outputting a real-world measurement based on a selection of pixels on the orthographic map.

5. The method of claim 1, wherein the annotating is performed using a deep-learning neural network.

6. The method of claim 1, wherein the estimating the offset is based on generating a point cloud for the objects in each of the surface planes.

7. The method of claim 1, wherein the determining the orientation of the projection plane comprises using a numerical optimizer to minimize differences in coordinates of endpoints of the plurality of orientation lines.

8. The method of claim 1, wherein each of the orientation lines are substantially horizontal lines or substantially vertical lines.

9. The method of claim 8, wherein the determining the orientation of the projection plane comprises using a numerical optimizer to minimize differences in Y-coordinates of endpoints of the substantially horizontal lines or X-coordinates of endpoints of the substantially vertical lines.

10. The method of claim 1, further comprising generating, with the AR engine, a pivot point in a common visible position of each image of the at least one image and determining an optimum rotation angle $\theta_{opt}$ of a test plane that intersects with the pivot point such that the test plane matches the projection plane.

11. The method of claim 1, wherein $\theta_{opt}$ is an optimum rotation angle of a test plane that intersects with a pivot point such that the test plane matches the projection plane.

12. A system, comprising:
    a computing device, comprising:
        a processor,
        memory in communication with the processor;
        a camera configured to capture digital images and store them in the memory;
        one or more position sensors; and
        an augmented reality (AR) framework executed by the computing device and in communication with the one or more position sensors and the camera;
    wherein the computing device is configured to:
        capture, with the camera, at least one image of an interior environment, wherein the interior environment comprises a plurality of objects, each object having a surface oriented along a corresponding surface plane, and wherein the surface planes are parallel to each other;
        automatically annotate the at least one image with a plurality of orientation lines, each of the orientation lines corresponding to an edge of at least one object of the plurality of objects in at least one of the surface planes;
        determine, based on the plurality of orientation lines and information received from the AR framework, an orientation of a projection plane that is parallel to each of the surface planes, wherein the projection plane is representative of a real-world size of the interior environment;
        estimate an offset for each of the surface planes relative to the projection plane; and
        render, based on the offset for each of the surface planes, a two-dimensional orthographic map that models the interior environment; and
        construct a real-world projection plane normal N={cos ($\theta_{opt}$), 0, sin($\theta_{opt}$)} that specifies the projection plane, and wherein the rendering includes generating a plane having a local origin defined by an intersection plane with of the real-world projection plane normal N.

13. The system of claim 12, wherein the AR framework is configured automatically capture relative positions and orientations of the camera in a world coordinate system while the at least one image is captured.

14. The system of claim 12, wherein the computing device is configured to analyze image data of the digital images by the AR framework and inertial data generated by the one or more position sensors to automatically extract and output one or more measurements of the interior environment.

15. The system of claim 12, wherein the two-dimensional orthographic map includes a scale factor configured to convert pixels to a real-world unit of length.

16. The system of claim 12, wherein the computing device is further configured to extract and output a real-world measurement based on a selection of pixels on the orthographic map.

17. The system of claim 12, wherein the offset is estimated based on a point cloud generated by the AR framework for objects in each of the surface planes.

18. The system of claim 12, wherein the AR framework is configured to generate a pivot point in a common visible position of each image of the at least one image and determining an optimum rotation angle $\theta_{opt}$ of a test plane that intersects with the pivot point such that the test plane matches the projection plane, wherein an orientation of the projection plane is determined based on minimizing differences in coordinates of endpoints of the plurality of orientation lines.

19. A non-transitory medium with instructions stored thereon that, when executed by a processor of a computing device, cause the computing device to perform operations comprising:
    capturing, with a camera in communication with an augmented reality (AR) engine, at least one image of an interior environment, wherein the interior environment comprises a plurality of objects, each object having a surface oriented along a corresponding surface plane, wherein the surface planes are parallel to each other;
    annotating the at least one image with a plurality of orientation lines, each of the orientation lines corresponding to an edge of at least one object of the plurality of objects in at least one of the surface planes;
    determining, based on the plurality of orientation lines and information received from the AR engine, an orientation of a projection plane that is parallel to each of surface planes, wherein the projection plane is representative of a real-world size of the interior environment;
    estimating an offset for each of the surface planes relative to the projection plane; and
    rendering, based on the offset for each of the surface planes, a two-dimensional orthographic map that models the interior environment; and
    constructing a real-world projection plane normal N={cos ($\theta_{opt}$), 0, sin($\theta_{opt}$)} that specifies the projection plane, and wherein the rendering includes generating a plane having a local origin defined by an intersection plane with of the real-world projection plane normal N, wherein $\theta_{opt}$ is an optimum rotation angle of a test plane that intersects with a pivot point such that the test plane matches the projection plane.

* * * * *